(12) United States Patent
Moore

(10) Patent No.: US 7,327,894 B2
(45) Date of Patent: Feb. 5, 2008

(54) IMAGE COMPRESSION

(75) Inventor: Darnell J. Moore, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 624 days.

(21) Appl. No.: 10/981,827

(22) Filed: Nov. 5, 2004

(65) Prior Publication Data

US 2005/0100230 A1 May 12, 2005

Related U.S. Application Data

(60) Provisional application No. 60/518,452, filed on Nov. 7, 2003.

(51) Int. Cl.
*G06K 9/36* (2006.01)
*G06K 9/46* (2006.01)

(52) U.S. Cl. ............... 382/240; 382/248; 382/247
(58) Field of Classification Search ............... 382/240, 382/248, 247, 260; 375/240.19
See application file for complete search history.

(56) References Cited

U.S. PATENT DOCUMENTS 6,801,665 B1* 10/2004 Atsumi et al. .............. 382/239
6,978,048 B1* 12/2005 Higginbottom et al. ..... 382/240

* cited by examiner

*Primary Examiner*—Phuoc Tran
(74) *Attorney, Agent, or Firm*—Wade James Brady, III; Frederick J. Telecky, Jr.

(57) ABSTRACT

A method of image compression with wavelet transforms applied locally rather than globally by image component partitioning into independently transformed macroblocks plus overlapping data for filter length compensation.

6 Claims, 7 Drawing Sheets

|     | 16   | 32   | 48   | 64   |
|-----|------|------|------|------|
| 0   | 1LL2 | 2LL2 | 1HL2 | 2HL2 |
| 16  | 3LL2 | 4LL2 | 3HL2 | 4HL2 |
| 32  | 1LH2 | 2LH2 | 1HH2 | 2HH2 |
| 48  | 3LH2 | 4LH2 | 3HH2 | 4HH2 |
| 64  |      |      |      |      |

*FIG. 7a*

|     | 16   | 32   | 48   | 64   |
|-----|------|------|------|------|
| 0   | 1LL3 | 1HL3 | 1HL2 | 2HL2 |
| 16  | 1LL3 | 1HH3 | 3HL2 | 4HL2 |
| 32  | 1LH2 | 2LH2 | 1HH2 | 2HH2 |
| 48  | 3LH2 | 4LH2 | 3HH2 | 4HH2 |
| 64  |      |      |      |      |

*FIG. 7b*

|     | 16 | 32 | 48 | 64 | 80 | 96 | 112 | 128 |
|-----|----|----|----|----|----|----|-----|-----|
| 0   | 1  | 2  | 3  | 4  | 17 | 18 | 19  | 20  |
| 16  | 5  | 6  | 7  | 8  | 21 | 22 | 23  | 24  |
| 32  | 9  | 10 | 11 | 12 | 25 | 26 | 27  | 28  |
| 48  | 13 | 14 | 15 | 16 | 29 | 30 | 31  | 32  |
| 64  | 33 | 34 | 35 | 36 | 49 | 50 | 51  | 52  |
| 80  | 37 | 38 | 39 | 40 | 53 | 54 | 55  | 56  |
| 96  | 41 | 42 | 43 | 44 | 57 | 58 | 59  | 60  |
| 112 | 45 | 46 | 47 | 48 | 61 | 62 | 63  | 64  |
| 128 |    |    |    |    |    |    |     |     |

*FIG. 8*

IMAGE COMPRESSION

CROSS REFERENCE TO RELATED APPLICATIONS

This application claims priority from provisional application Ser. No. 60/518,452, filed Nov. 7, 2003.

BACKGROUND OF THE INVENTION

This invention relates to integrated circuits, and more particularly, to integrated circuits and image and video compression methods.

Recently, Digital Still Cameras (DSCs) have become a very popular consumer appliance appealing to a wide variety of users ranging from photo hobbyists, web developers, real estate agents, insurance adjusters, photo-journalists to everyday photography enthusiasts. Recent advances in large resolution CCD arrays coupled with the availability of low-power digital signal processors (DSPs) has led to the development of DSCs that come quite close to the resolution and quality offered by traditional film cameras. These DSCs offer several additional advantages compared to traditional film cameras in terms of data storage, manipulation, and transmission. The digital representation of captured images enables the user to easily incorporate the images into any type of electronic media and transmit them over any type of network. The ability to instantly view and selectively store captured images provides the flexibility to minimize film waste and instantly determine if the image needs to be captured again. With its digital representation the image can be corrected, altered, or modified after its capture. U.S. Pat. No. 5,528,293 and U.S. Pat. No. 5,412,425 disclose aspects of digital still camera systems including storage of images on memory cards and power conservation for battery-powered cameras.

Further, DSCs can be extended to capture video clips (short video sequences) and to compress (sequences of) images with block-based methods such as JPEG or JPEG2000. Block-based methods typically decompose an image into macroblocks with each macroblock containing a certain number of 8×8 blocks, depending upon the chroma-format used. For example, in the case of 4:2:0 chroma-format a macroblock is made up of four 8×8 luminance blocks and two 8×8 chrominance blocks. FIGS. 2d-2e depict functions and blocks of a digital camera system. JPEG provides compression by transforming the 8×8 blocks into the frequency domain with an 8×8 DCT (discrete cosine transform) and then quantizing the DCT coefficient blocks, scanning the 8×8 quantized coefficients into a 1-D sequence, and variable length coding (VLC) the sequence. For predictive coding in which motion compensation (MC) is involved, inverse-quantization and IDCT (inverse DCT) are needed for the feedback loop. The quantization is a lossy step, and the inverse quantization does not recover the information loss.

In contrast to JPEG, JPEG2000 provides a 20% compression advantage, both lossy and lossless compression, enables progressive transmission by resolution (which can generate a small image from the code for the full size image), and facilitates scalable video with respect to resolution, bit-rate, color component, or position with transcoding by using Motion JPEG2000. See, Christopoulos et al, The JPEG2000 Still Image Coding System: an Overview, 46 IEEE Trans. Consuer Elect. 1103 (2000).

However, JPEG2000 requires significantly more computation and memory to encode images than JPEG; indeed, JPEG typically requires 10× the computation and 256× the memory for interim data storage during compression. JPEG2000 encoders running in embedded devices are particularly sensitive to memory-hungry applications. That is, JPEG2000 has a problem of large memory demand.

SUMMARY OF THE INVENTION

The invention provides a block-based version of wavelet image coding by independently applying wavelet transform to each block plus bounding pixels rather than to an entire image at once.

This has advantages including reduction in encoding memory use.

BRIEF DESCRIPTION OF THE DRAWINGS

FIGS. 7a-7b show partition after second level decomposition.

FIG. 8 is another preferred embodiment tile component partition.

DESCRIPTION OF THE PREFERRED EMBODIMENTS

1. Overview

The preferred embodiment image compression methods efficiently encode (sequences of) JPEG2000 images by partitioning a tile component into macroblocks and performing the wavelet transform filtering independently on the macroblocks. Overlap data from adjacent blocks is used to extend a macroblock to account for filter length. The performance of the wavelet transform filtering on a macroblock basis allows for smaller memories; for example, the image buffer in FIG. 2e needs to only hold the macroblock plus overlap data for the DSP and/or IMX (image coprocessor) to compute the wavelet transform coefficients. The input tile components and output JPEG2000 code are stored in the memory.

2. JPEG2000

Figure 1:
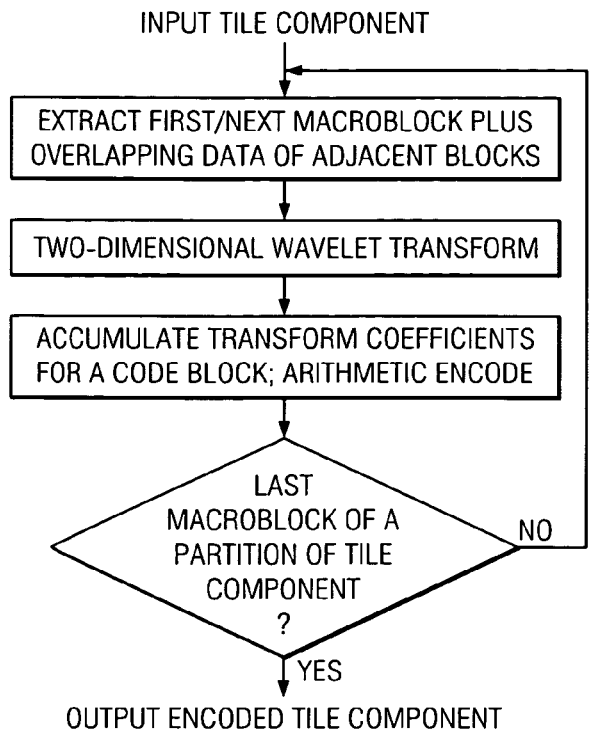
FIG. 1 is a flow diagram for a preferred embodiment method.
Figure 2A:
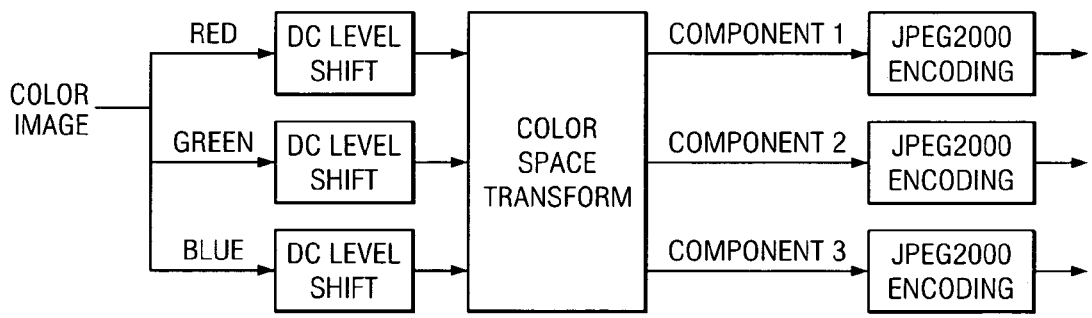
FIGS. 2a-2e illustrate JPEG2000 and digital camera blocks.
Figure 2B:
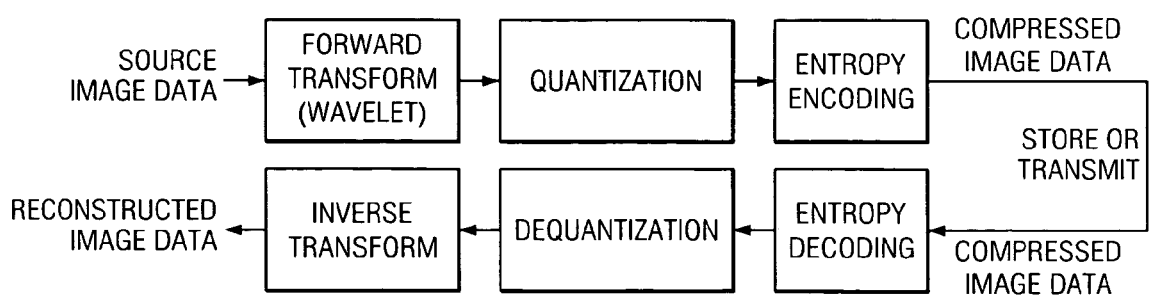
Figure 2C:
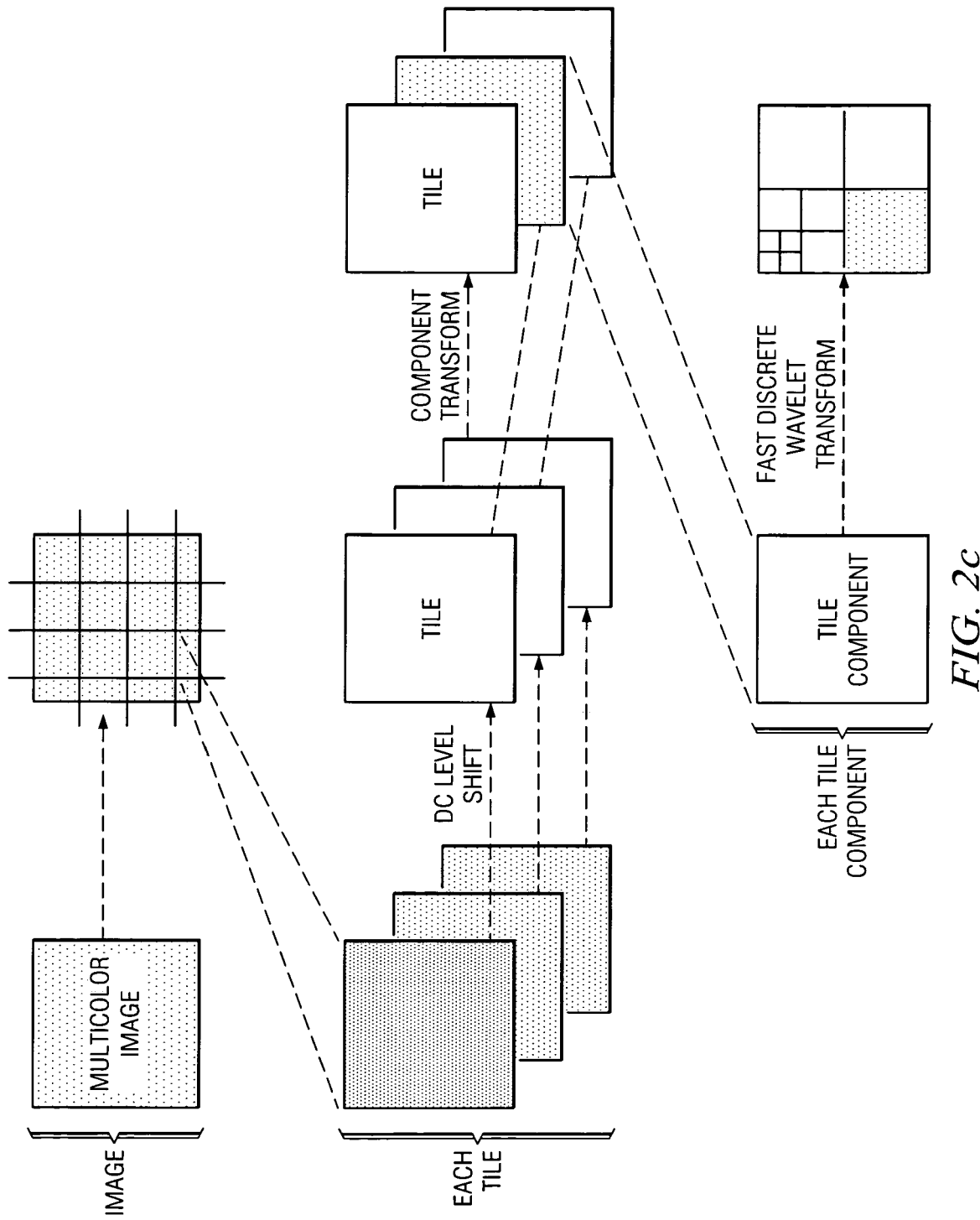

FIGS. 2a-2c illustrate steps in JPEG2000 encoding and decoding for a color image. The color space transform may be a transform such as RGB (red, green, blue) to YCbCr (luminance, chroma blue, chroma red) or other such transform. A source image is partitioned into non-overlapping rectangular "tiles" which are independently encoded. Smaller tiles lead to larger tile artifacts but also to smaller processor and memory demands. For example, code streams for Profile0 Class 0 decoders must have tiles no larger than 128×128 pixels; however, even with this limitation 16 k of addressable memory locations per tile component are still needed.

JPEG2000 uses a separable two-dimensional discrete wavelet transform to decompose a tile component into bands of spatial frequencies; such as lowpass and highpass subbands. The bands typically are subsampled and form a hierarchy as shown in FIG. 2c. JPEG2000 specifies two one-dimensional, bi-orthogonal, odd-length FIR wavelet filters to support both lossy and lossless encoding. The 5/3-spline transform (5-tap lowpass and 3-tap highpass) is reversible; this permits lossless compression. Contrarily, the floating-point CDF 9/7 transform (9-tap lowpass and 7-tap highpass) is not reversible and thus allows only lossy compression.

Figure 3A:
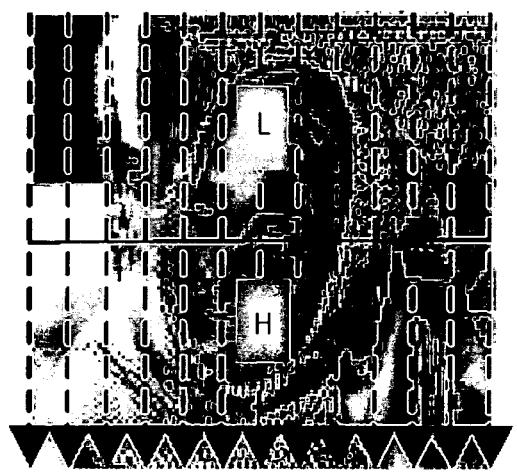
FIGS. 3a-3c show wavelet transform decomposition of a tile component.
Figure 3B:
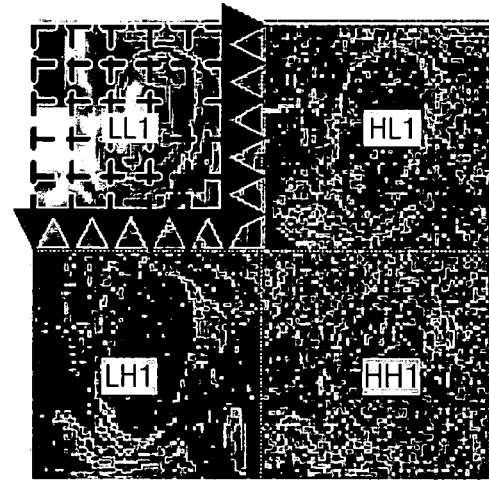

The one-dimensional filters may be implemented as either lifting-based or convolution-based. The wavelet transform filters the image using the row-column (or column-row) approach over global regions of the tile component. The process begins by symmetrically extending the boundaries of the tile (extend 2 pixels in each direction for 5/3 filtering or 4 pixels for 9/7 filtering), then filtering each column of the extended tile component using the lowpass and highpass filters. The transform coefficients (filter output) are subsampled by a factor of 2 and organized so that lowpass and highpass values are separated into directional bands; e.g., vertical subband decomposition as in FIG. 3a. These coefficients are filtered again using the same transform, but by a row at a time; e.g., horizontal subband decomposition. This vertical and horizontal subband decomposition produces four two-dimensional subbands, each containing directional frequency information; e.g., LL (lowpass-lowpass), HL, LH, and HH as shown in FIG. 3b which illustrates a 128×128 tile component yielding four 64×64 subbands. Spatial frequency decomposition using the same row-column process is duplicated for each tile-component.

Figure 3C:
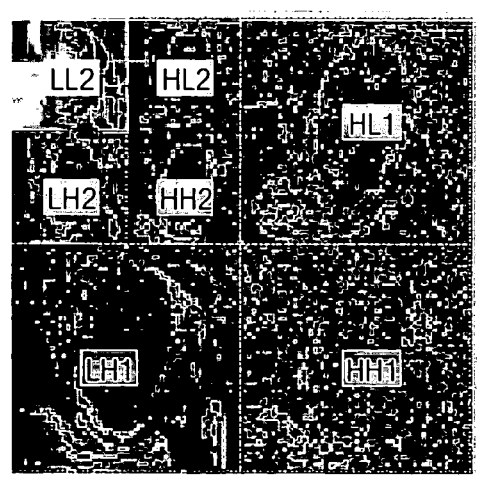

Repeating the decomposition on the 64×64 LL subband gives four 32×32 second level subbands: LL2, LH2, HL2, and HH2; FIG. 3c indicates the other three 64×64 subbands from the first level filtering as LH1, HL1, and HH1.

Quantizing the transform coefficients provides compression.

The (quantized) transform coefficients are entropy encoded with a context dependent binary arithmetic coding (the QM coder). In particular, divide each subband into rectangular blocks with sets of three corresponding rectangles (one from each of the HL, LH, and HH of the same level) forming packet partition locations. Each packet partition location is divided into "code blocks" which are the inputs to the QM coder. The bit planes of the coefficients in a code block are encoded using three coding passes (significance propagation, magnitude refinement, and cleanup); each coding pass collects context information about the bit plane.

The arithmetic coder output falls into one or more resolution-increasing layers in the code stream; each layer consists of a number of consecutive bit plane encoding passes from each code block in the tile. The number of coding passes in a layer may vary amongst code blocks. Each layer adds to the image quality, so the decoder is able to decode the code block contributions contained in each layer in sequence. For a given code block the first coding pass in layer n is the coding pass immediately following the last coding pass for the code block in layer n−1. The arithmetic coder is terminated (reset) either only at the end of a code block or at the end of each coding pass. Code blocks are typically 16×16 or 32×32.

3. 32×32 Macroblock Preferred Embodiments

The preferred embodiment methods use block-based wavelet transform filtering instead of global tile-component-based filtering; these methods apply to either the lossless or lossy filtering and are also invariant to the convolution or lifting filtering implementation. These block-based methods perform the wavelet processing locally on overlapping blocks instead of globally over the entire tile component. In particular, proceed as follows for a 128×128 tile component.

(1) Partition Image Tile Component Into Macroblocks.

Figure 4:
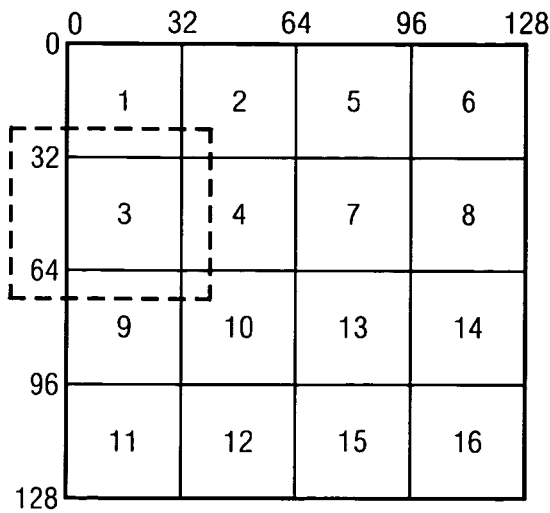
FIG. 4 is a preferred embodiment tile component partition.

Partition a tile component into macroblocks which will be independently processed. A first preferred embodiment method partitions a 128×128 tile into sixteen 32×32 macroblocks. Each macroblock is filtered with the two-dimensional wavelet transform (i.e., the columns and then the rows by the one-dimensional 5/3 or 9/7 lowpass and highpass filters). The macroblocks are filtered in order as indicated by FIG. 4; namely, ordering analogous to LL, HL, LH, HH ordering of the subband levels. To avoid border artifacts at each macroblock boundary, include in the image data to be filtered the pixel values from the adjacent blocks beyond the macroblock's borders; The dotted line rectangle in FIG. 4 shows this data overlap in adjacent macroblocks for macroblock number 3. This use of actual neighboring data differs from the usual symmetrical extension of data beyond borders; indeed, a tile component has data extension beyond boundaries by symmetrical extension. The size of the data overlap into adjacent blocks depends upon the filter's length. For instance, during horizontal subband decomposition, a highpass filter of length 7 applied to a macroblock with width 32 will need a region of support of width 38 (=32+(7−1)); that is, extension by 3 pixel values to both the left and the right horizontally.

Macroblocks on the perimeter of the tile component present a special case because there are no adjacent blocks along the macroblock border(s) on the perimeter. In this case, the overlapping data are created by symmetrically extending interior macroblock values (as is done for the tile component itself during global filtering). More explicitly, let $x_0$ be the value of a boundary pixel of a macroblock which also is on the perimeter of a tile, and let $x_1, x_2, x_3, \ldots$ be the values of successive pixels extending (horizontally for vertically) into the macroblock from the $x_0$-valued pixel; then define pixel values outside the tile extending (horizontally or vertically) from the $x_0$-valued pixel by successive pixel values $x_1, x_2, x_3, \ldots$ In the event that the number of extended pixel values needed is greater than the number of pixels in the tile component (as could happen after many subsampling levels), extend periodically. For example, if the tile is only four pixels wide or high, say $\{x_0, x_1, x_2, x_3\}$, and more than 3 extended pixels are needed, then extend as $x_1, x_2, x_3, x_2, x_1, x_0, x_1, x_2, \ldots$.

The wavelet transform filtering of the next step will be independently performed on each macroblock plus overlapping data, so the memory need only hold 38×38 (=1444) pixel values. Thus the memory requirement has dropped from 16 k for 128×128 to 1444 for a 32×32 macroblock plus overlap. Of course, the overlap data is part of adjacent macroblocks and will be used when those macroblocks are transformed; thus the overlap data is redundantly read and filtered which increases computation cost.

(2) Apply the Wavelet Transform to Each Macroblock

Figure 5A:
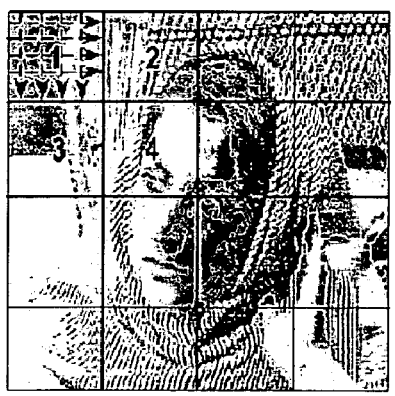
FIGS. 5a-5c show wavelet transform decomposition of macroblocks.
Figure 5B:
Figure 5C:
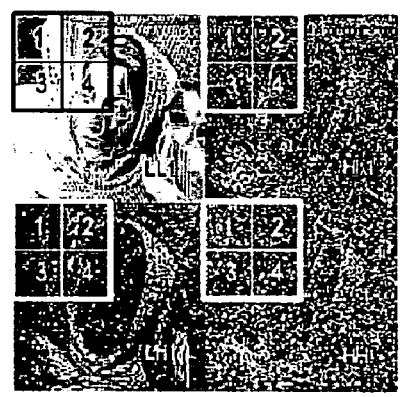

Apply the two-dimensional wavelet transform to each 32×32 macroblock plus overlap data in the typical row-column approach as illustrated in FIG. 5a. Again, either convolution or lifting-based implementations of the filtering can be used. The output will contribute smaller portions of the subband due to the downsampling; for example, after the two-dimensional wavelet transform filtering of a 32×32 macroblock plus overlap data, there are four different 16×16 subbands (LL, HL, LH, and HH) as shown in FIG. 5b. Note that only coefficients contained within macroblock boundaries are used (values from overlapping areas are discarded). These subband contributions can be buffered in memory until neighboring macroblocks can be processed. When four adjacent macroblocks have been filtered, there will be enough coefficients to begin embedded block and arithmetic encoding of a 32×32 code-block, the smallest size specified by JPEG2000 within the largest resolution level. Code-blocks are coded independently, which offers practical advantages to multiprocessor systems. If multiple processors are available, such as in the digital media processor DM310 from Texas Instruments, a processor can be used to begin encoding code-blocks in the HL, LH, and HH subbands while other processors can continue wavelet filtering. For example, the digital camera system of FIG. 2e has a dedicated variable length coder (VLC) along with the digital signal processor (DSP) and image processor (IMX). After code-blocks have been encoded, the memory which held them can be freed and reused. LL subbands can also be encoded the same way during the final resolution level or held in memory until wavelet decomposition is completed. In contrast, sequential processing requires that all transform coefficients in all subbands be buffered before encoding, quadrupling memory requirements.

(3) To Process Multiple Decomposition Levels, Apply Wavelet Recursively

Figure 6:
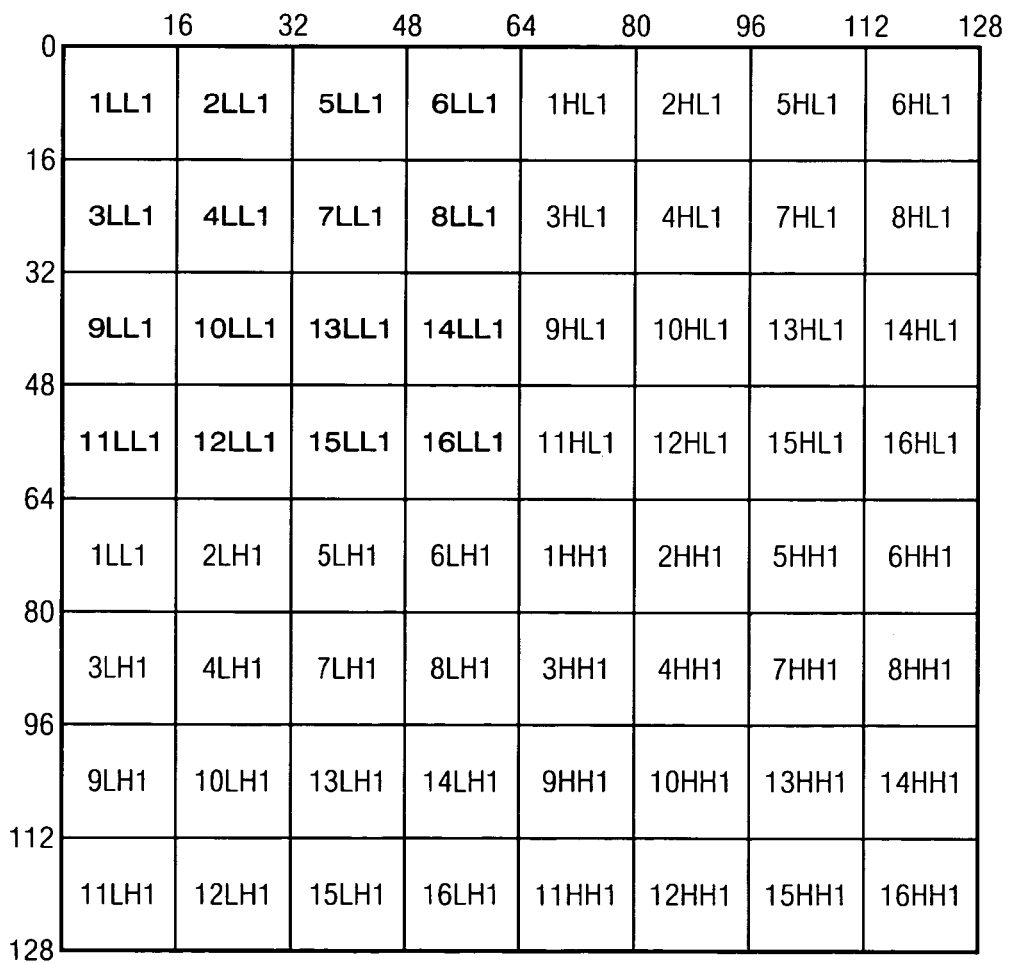
FIG. 6 illustrates macroblock contributions to subbands of a tile component.

If more than one level of resolution is required, store LL subband coefficients until all macroblocks in the tile component have been filtered. For example, FIG. 6 shows all sixty-four of the subband contributions from the sixteen macroblocks after the first level of two-dimensional wavelet decomposition for a 128×128 tile component. For the second level decomposition, all sixteen 16×16 LL1 subband parts from the sixteen first level decomposition macroblocks are combined to form the 64×64 LL1 subband as indicated by the upper left portion of FIG. 6. As before, this region is divided into four 32×32 macroblocks. Row-column wavelet filtering produces sixteen subband contributions, which are buffered until they can be encoded or filtered for additional decomposition levels. FIG. 7a shows the subband contributions from the four 32×32 macroblocks of subband LL1 after the second level decomposition; note that all of LL2 fits into a single 32×32 macroblock (1LL2+2LL2+3LL2+4LL2). FIG. 7b shows the subband contributions after the third level decomposition of LL1; in particular, 32×32 LL2 decomposes into four 16×16 blocks: 1LL3+1HL3+1LH3+1HH3.

4. Alternative Size Preferred Embodiments

For purposes of illustration, previous examples have used macroblocks of size 32×32, but the preferred embodiment methods are not confined to these dimensions. For example, if device limitations restricted memory so that only 16×16 macroblocks could be used, then a 128×128 tile component could be partitioned into sixty-four macroblocks with the macroblock ordering as shown in FIG. 8. Efficiency is also expected to diminish. The ordering, in this case, is not unique to achieving optimal efficiency as far as concurrent processing is concerned. However, the order does guarantee that entropy encoding can proceed as quickly as possible; e.g., after sixteen macroblocks have been filtered. In general, the processing order that produces sufficient transform coefficients to complete a 32×32 code-block in the shortest time is optimal, in a concurrent processing sense. The preferred embodiment methods are also invariant to the size of the tile component.

More generally, non-square tile components and/or macroblocks may be used, and sizes which include a factor of a power of 2 allow for simple subsampling after wavelet lowpass-highpass filterings. Indeed, the following combinations may be useful:

| Tile component size | Macroblock sizes |
| --- | --- |
| 128 × 128 | 32 × 32, 16 × 16, 32 × 16 |
| 128 × 96 | 32 × 32, 16 × 16, 32 × 16 |
| 128 × 32 | 32 × 32, 16 × 16, 32 × 16 |
| 64 × 64 | 32 × 32, 16 × 16, 32 × 16 |

5. Systems

Figure 2D:
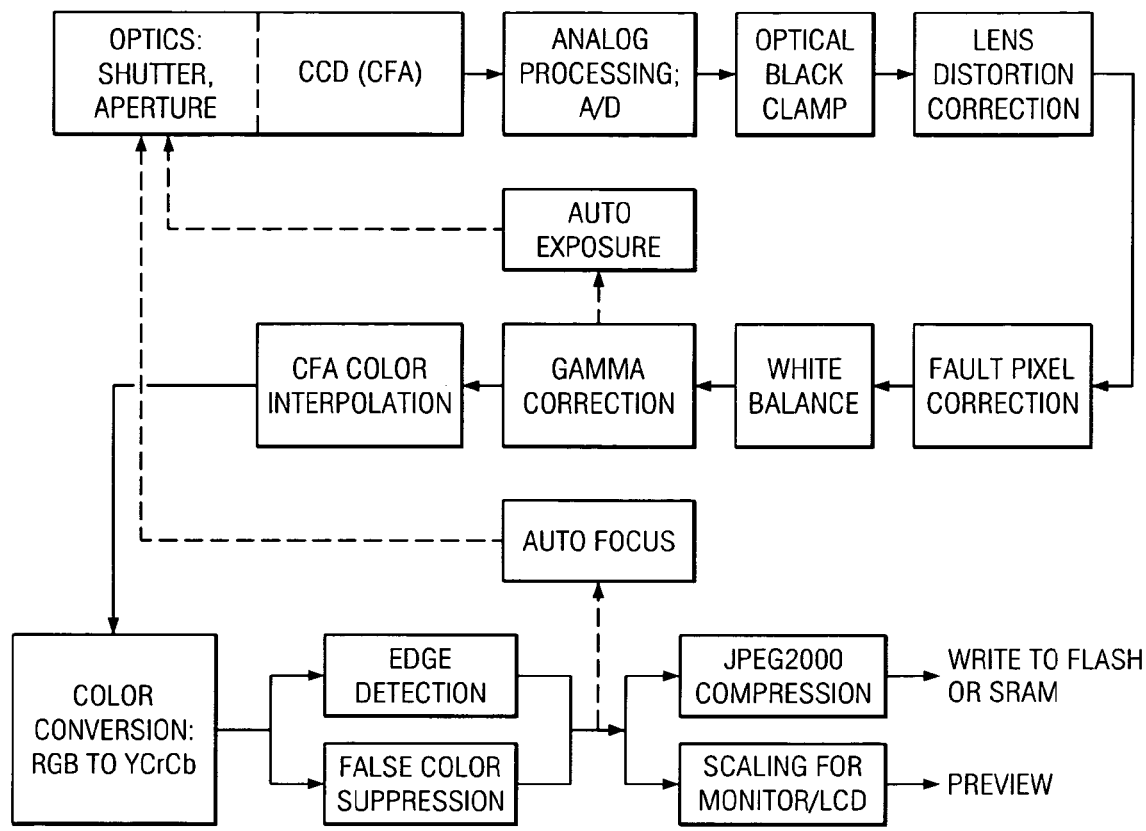
Figure 2E:
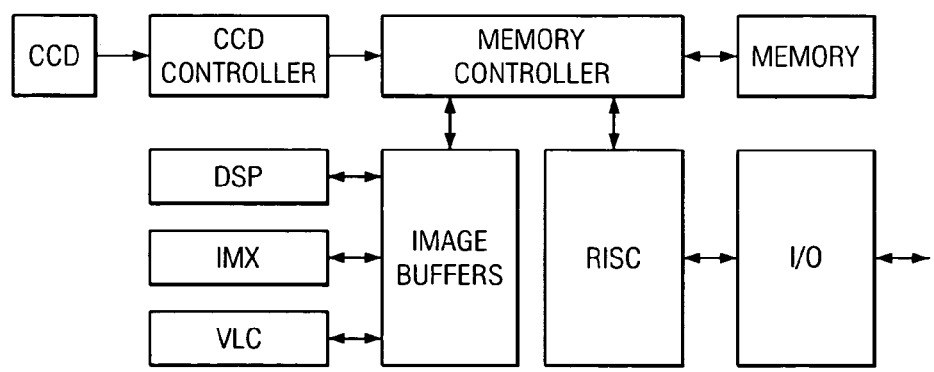

The preferred embodiment methods are well-suited for environments which require continuous compression and storage of video or sequences of images which contain only partial spatial updates. FIGS. 2d-2e illustrates functional and system blocks of a preferred embodiment digital camera which includes the preferred embodiment JPEG2000 implementations; the encoding steps may be programmed into flash and/or ROM instruction memory for the processors shown in FIG. 2e (RISC, DSP, IMX, VLC).

6. Modifications

The preferred embodiments can be varied while maintaining the features of image wavelet transform based on macroblocks instead of tile-components in order to limit memory demand.

For example, the sizes of the tile components and sizes of the macroblocks could be varied, and the number of decomposition levels could vary among the macroblocks in order to provide higher resolution in portions of the tile component.

What is claimed is:

1. A method of image encoding, comprising:
   (a) extracting a first n×m block of pixels from an N×M tile component of pixels, where n, m, N, and M are each integers greater than 1 and n is less than N;
   (b) extracting, from said tile component, overlap pixels bounding said first block with the number of said overlap pixels dependent upon the length of a wavelet filter;
   (c) applying said wavelet filter to said first block plus said overlap pixels; and
   (d) repeating steps (a)-(c) for second, third, . . . , and Kth n×m blocks of pixels from said tile component where K is a positive integer greater than 1; and
   (e) encoding the results of said steps (c)-(d).

2. The method of claim 1, wherein:
   (a) n=m=32; and
   (b) N=M=128.

3. A method of image encoding, comprising:
   (a) providing an N×M tile component of pixels of an image, where N and M are each integers greater than 1;
   (b) for each integer k in the range from 1 to K, where K is an integer greater than 1:
      (i) extracting from said tile component an n×m block of pixels, B(k), where n and m are each integers greater than 1 and n is less than N;
      (ii) extracting from said tile component overlap pixels, O(k), which bound said B(k) with the number of pixels in O(k) dependent upon the length of a wavelet filter;
      (iii) applying said wavelet filter to B(k) plus O(k); and
      (iv) encoding results of step (iii) for B(k) plus O(k) when results of step (iii) for B(k) plus O(k) together with not-yet-encoded results of steps (iii) for B(j)

plus O(j) for one or more j in the range from 1 to k−1, provide sufficient data for encoding.

4. The method of claim 3, wherein:
(a) said encoding of steps (d) of claim 3 is context-dependent arithmetic encoding; and said sufficient data is a code block.

5. The method of claim 3, wherein:
(a) n=m=32; and
(b) N=M=128.

6. A digital camera, comprising:
(a) an image capture subsystem; and
(b) an image compression subsystem coupled to said image capture subsystem and operable to encode a tile component of an image with the steps of:

(i) extracting a first n×m block of pixels from said N×M tile component of pixels, where n, m, N, and M are each integers greater than 1 and n is less than N;
(ii) extracting, from said tile component, overlap pixels bounding said first block with the number of said overlap pixels dependent upon the length of a wavelet filter;
(iii) applying said wavelet filter to said first block plus said overlap pixels; and
(iv) repeating steps (i)-(iii) for second, third, . . . , and Kth n×m blocks of pixels from said tile component where K is a positive integer greater than 1; and
(v) encoding the results of said steps (iii)-(iv).

* * * * *